United States Patent
Sinha et al.

(10) Patent No.: US 10,868,698 B1
(45) Date of Patent: Dec. 15, 2020

(54) METHOD AND SYSTEM FOR ALLOWING A CLIENT TO RE-INITIATE DHCP REQUEST AFTER UNDERGOING VLAN CHANGE

(71) Applicant: ALE USA INC., Calabasas, CA (US)

(72) Inventors: Abhishek Sinha, Bangalore North (IN); Sandeep Kumar, Bangalore (IN)

(73) Assignee: ALE USA INC., Calabasas, CA (US)

( * ) Notice: Subject to any disclaimer, the term of this patent is extended or adjusted under 35 U.S.C. 154(b) by 13 days.

(21) Appl. No.: 16/427,063

(22) Filed: May 30, 2019

(51) Int. Cl.
*H04L 12/46* (2006.01)
*H04L 29/12* (2006.01)
(Continued)

(52) U.S. Cl.
CPC .......... *H04L 12/4641* (2013.01); *H04L 12/08* (2013.01); *H04L 12/56* (2013.01);
(Continued)

(58) Field of Classification Search
None
See application file for complete search history.

(56) References Cited

U.S. PATENT DOCUMENTS

| | | | |
|---|---|---|---|
| 6,205,465 B1 * | 3/2001 | Schoening | G06F 8/456 709/223 |
| 2007/0136575 A1 * | 6/2007 | Gutekunst | H04L 12/1432 713/156 |

(Continued)

OTHER PUBLICATIONS

Extended European Search Report with regard to the European Patent Application No. 20171148.8 completed Oct. 5, 2020.

*Primary Examiner* — Eunsook Choi
(74) *Attorney, Agent, or Firm* — BCF LLP (57) ABSTRACT

A method and system are devised of moving at a NAS (1) a client (12, 13) with a MAC address, from a first VLAN to a second VLAN. A leaf is comprised of at least one intermediate L2 bridge/switch (5, 9) being connected to the NAS (1). The client (12, 13) is being connected to one (9) of the at least one intermediate L2 bridge/switches (5, 9) in the leaf. The method and system involve sending at the NAS (1) a first message downlink (31, 36) to intermediate L2 bridge/switches (5) in the leaf directly connected to the NAS. They further involve at each intermediate L2 bridge/switch (5, 9) in the leaf: upon receiving the first message from uplink from the NAS (1) or an intermediate L2 bridge/switch (5, 9) in the leaf, determining whether the client (12, 13) is directly or indirectly connected to one of its ports; and if it is directly connected, bouncing the port to which the client (12, 13) is connected, and sending a second message uplink to the NAS (1) or an intermediate L2 bridge/switch (5, 9) in the leaf; if it is indirectly connected, sending the first message downlink on the port to which the client (12, 13) is indirectly connected to an intermediate L2 bridge/switches (5, 9) in the leaf; and if it is not connected, sending a third message uplink to the NAS (1) or an intermediate L2 bridge/switch (5, 9) in the leaf. They further involve at each intermediate L2 bridge/switch (5, 9) in the leaf: upon receiving the second or third message from downlink from an intermediate L2 bridge/switch (5, 9) in the leaf, forwarding it uplink to the NAS (1) or an intermediate L2 bridge/switch (5, 9) in the leaf. Finally the client (12, 13) may initiate a DHCP request in the second VLAN.

20 Claims, 4 Drawing Sheets

(51) Int. Cl.
*H04L 12/08* (2006.01)
*H04L 12/54* (2013.01)
*H04L 12/70* (2013.01)

(52) U.S. Cl.
CPC ...... *H04L 61/2015* (2013.01); *H04L 61/6022* (2013.01); *H04L 2012/5617* (2013.01); *H04L 2012/5618* (2013.01)

(56) References Cited

U.S. PATENT DOCUMENTS

| | | | |
|---|---|---|---|
| 2009/0164649 A1* | 6/2009 | Kawato | G06F 21/6218 709/229 |
| 2010/0027536 A1* | 2/2010 | Jorgens | H04L 69/161 370/389 |
| 2014/0344444 A1 | 11/2014 | Wu et al. | |
| 2015/0163192 A1* | 6/2015 | Jain | H04L 43/04 370/255 |
| 2016/0080318 A1 | 3/2016 | Sood et al. | |
| 2019/0334894 A1* | 10/2019 | Hemaraju | H04L 63/12 |

\* cited by examiner

METHOD AND SYSTEM FOR ALLOWING A CLIENT TO RE-INITIATE DHCP REQUEST AFTER UNDERGOING VLAN CHANGE

FIELD

The present technology relates to allowing in a network a client to re-initiate DHCP request after undergoing a VLAN change.

BACKGROUND

Today, in a Network Access Server (NAS), ports are made secure for any traffic from/to the connecting clients by forcing them to undergo authentication on the port. Only clients successfully authenticated on the port are allowed network access by assigning them into a Virtual Local Area Network (VLAN) obtained as result of authentication using for example Remote Authentication Dial-In User Service (RADIUS).

As is known, different types of authentication on a NAS port may be had, including 802.1x-authentication, Mac-authentication, or Web-based (Captive-Portal authentication). Based on the results of the authentication, the client is assigned a VLAN, where it may obtain an IP address lease from a Dynamic Host Configuration Protocol (DHCP) server network access.

The assigned VLAN may however be changed, for example as a result of, without limitation:

the client might be made to undergo re-authentication at the NAS, resulting in the assignment of a different VLAN;

the HTTP based client which was initially assigned to a temporary (guest) VLAN, is challenged to undergo Captive-Portal (CP) authentication. The CP authentication might result in a different VLAN being assigned to the client MAC;

the NAS receives RADIUS Change of Authorization (CoA) message for the client MAC forcing it to assign a different VLAN to the client; or the NAS receives RADIUS Disconnect Message (DM) message from RADIUS for the client MAC forcing its session to be purged (MAC address flushed) on the NAS, which forces the client to undergo re-assignment at NAS. Upon re-assignment, the client may get assigned a different VLAN.

When a non-supplicant client is either directly or indirectly connected to a port on a NAS, and there is a change of VLAN for the client, it is necessary for the client to re-initiate a fresh DHCP lease request in the new VLAN.

When the non-supplicant client is directly connected to the NAS, DHCP re-initiation consists in the NAS performing port bounce on the direct interface with the non-supplicant client, followed by re-assigning the client MAC back in the new VLAN. The client may then undergo a fresh DCHP lease in the new VLAN.

When however the non-supplicant client is only indirectly connected to the NAS, such as for example in the situation when the client is connected to intermediate L2 bridges/switches, it remains assigned to the old VLAN. Currently, there exists no solution for achieving port bounce for wired Non-Supplicant clients indirectly connected to the NAS, after the client MAC undergoes a VLAN change at the NAS. Thus, non-supplicant client continues to use IP leased in the old VLAN, and experiences network access issues after VLAN change.

This is also true for a wireless non-supplicant client connected to an Access Point (AP), for example in Open SSID mode, and undergoing authentication with the NAS to which the AP is (directly or indirectly) connected. After initial authentication resulting in assigning the wireless client MAC to a VLAN on the NAS, if the client MAC undergoes change in VLAN, there exists no way to inform the AP to dis-associate the client MAC for re-assignment at AP in order to facilitate DHCP fresh lease in the new VLAN. Hence, the wireless non-supplicant client continues to use the IP leased in the old VLAN, and too experiences network access issues after a VLAN change.

There is therefore a need for a method and system that allows a client, either supplicant or non-supplicant, to re-initiate DHCP request after a VLAN change.

SUMMARY

Various implementations of the present technology provide a method of moving at a Network Access Server (NAS) a client with a MAC address, from a first Virtual LAN (VLAN) to a second VLAN, a leaf comprised of at least one intermediate L2 bridge/switch being connected to the NAS, and the client being connected to one of the at least one intermediate L2 bridge/switches in the leaf, the method comprising the steps of:

sending at the NAS a first message downlink to at least one of intermediate L2 bridge/switches in the leaf directly connected to the NAS;

at each intermediate L2 bridge/switch in the leaf:

upon receiving the first message from uplink from the NAS or an intermediate L2 bridge/switch in the leaf:

determining whether the client is directly or indirectly connected to one of its ports; and:

if it is directly connected, bouncing the port to which the client is connected, and sending a second message uplink to the NAS or an intermediate L2 bridge/switch in the leaf;

if it is indirectly connected, sending the first message downlink on the port to which the client is indirectly connected to an intermediate L2 bridge/switches in the leaf; and if it is not connected, sending a third message uplink to the NAS or an intermediate L2 bridge/switch in the leaf;

upon receiving the second or third message from downlink from an intermediate L2 bridge/switch in the leaf, forwarding it uplink to the NAS or an intermediate L2 bridge/switch in the leaf; and initiating at the client a DHCP request in the second VLAN.

In various implementations of the present method, the leaf is further comprised of at least one Access Point (AP) and the client is being connected to one of the at least one AP in the leaf, and the method further comprises:

at each AP in the leaf:

upon receiving the first message from uplink from the NAS or an intermediate L2 bridge/switch in the leaf:

determining whether the client is directly connected to one of its ports; and:

if it is directly connected, disassociating then reassociating the MAC address, and sending a second message uplink to the NAS or an intermediate L2 bridge/switch in the leaf; and if it is not connected, sending a third message uplink to the NAS or an intermediate L2 bridge/switch in the leaf.

In various implementations of the present method, the first message comprises a LLDPDU with a Cmd-Type Request(0) and the MAC address.

In various implementations of the present method, the second message comprises a LLDPDU with a Cmd-Type ACK(1) and the MAC address.

In various implementations of the present method, the third message comprises a LLDPDU with a Cmd-Type NAK(2) and the MAC address.

In various implementations of the present method, the Cmd-Type and the MAC address are included in one of the TLV types 9 to 127 in a 802.1AB IEEE Standard LLDPDU.

In various implementations of the present method, the client is a non-supplicant client.

Various implementations of the present technology also provide a L2 bridge/switch configured to, when included in a leaf comprised of at least one intermediate L2 bridge/switch being connected to a NAS, with a client being connected to one of the at least one intermediate L2 bridge/switches in the leaf:

upon receiving a first message from uplink from the NAS or an intermediate L2 bridge/switch in the leaf:
    determine whether the client is directly or indirectly connected to one of its ports; and:
      if it is directly connected, bounce the port to which the client is connected, and send a second message uplink to the NAS or an intermediate L2 bridge/switch in the leaf;
      if it is indirectly connected, send the first message downlink on the port to which the client is indirectly connected to an intermediate L2 bridge/switches in the leaf; and
      if it is not connected, send a third message uplink to the NAS or an intermediate L2 bridge/switch in the leaf; and
  upon receiving the second or third message from downlink from an intermediate L2 bridge/switch in the leaf, forwarding it uplink to the NAS or an intermediate L2 bridge/switch in the leaf.

In various implementations of the present L2 bridge/switch:

the first message comprises a LLDPDU with a Cmd-Type Request(0) and the MAC address;

the second message comprises a LLDPDU with a Cmd-Type ACK(1) and the MAC address; and the third message comprises a LLDPDU with a Cmd-Type NAK(2) and the MAC address.

In various implementations of the present L2 bridge/switch, the Cmd-Type and the MAC address are included in one of the TLV types 9 to 127 in a 802.1AB IEEE Standard LLDPDU.

Various implementations of the present technology also provide a NAS configured to:

upon receiving a request to move a client with a MAC address, from a first VLAN to a second VLAN, send a first message downlink to at least one of intermediate L2 bridge/switches or an AP in a leaf directly connected to the NAS; and upon receiving from downlink from any intermediate L2 bridge/switch or AP in the leaf, a second message that the port to which the client is connected was bounced, or that the MAC address was disassociated and re-associated, allowing the client to initiate a DHCP request in the second VLAN.

In various implementations of the present NAS:

the first message comprises a LLDPDU with a Cmd-Type Request(0) and the MAC address;

the second message comprises a LLDPDU with a Cmd-Type ACK(1) and the MAC address; and the third message comprises a LLDPDU with a Cmd-Type NAK(2) and the MAC address.

In various implementations of the present NAS, the Cmd-Type and the MAC address are included in one of the TLV types 9-127 in a 802.1AB IEEE Standard LLDPDU.

Various implementations of the present technology also provide a computer-implemented system configured to perform the present method.

Various implementations of the present technology also provide a computer-readable medium comprising instructions causing to perform the present method.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Finally, elements that are identical from one drawing to the other bear the same numeral reference across drawings.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that «module» may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 1:
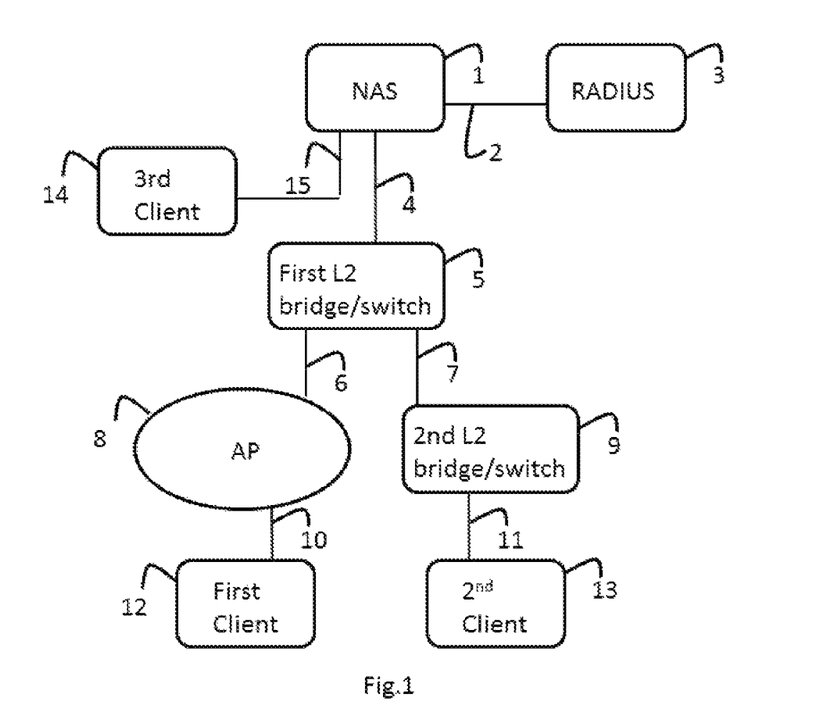
FIG. 1 illustrates an exemplary network topology in which the present technology may be implemented.

FIG. 1 illustrates an exemplary network topology in which the present technology may be implemented. A L2 switch acting as a NAS 1 may be connected through link 2 to a RADIUS server 3, and through link 4 to a first L2 bridge/switch 5. The first L2 bridge/switch 5 is itself connected through link 6 to an AP 8, and through link 7 to a second L2 bridge/switch 9. First client 12 is connected to AP 8 through a wireless link 10, while $2^{nd}$ client 13 is connected to second L2 bridge/switch 9 through a wire link 11. First L2 bridge/switch 5 and second L2 bridge/switch 9 may thus be considered intermediate bridges/switches between the NAS 1 and respectively the First client 12 and the $2^{nd}$ client 13. Even though not limiting the application of the technology, this illustration is typical of the topology of many networks featuring intermediate bridges/switches between the NAS and the clients. As will be appreciated by the person skilled in the art, the actual number of intermediate bridges/switches between the NAS and the clients may be much larger. The network topology illustrated in FIG. 1 is exemplary, and any suitable network topology may be used. A third client 14 is also illustrated in FIG. 1 as directly connected to NAS 1 through link 15.

When the clients are "non-supplicant", this means the clients are not running supplicant software and do not support 802.1x authentication and in particular Extensible Authentication Protocol over LAN, and as discussed above, creates particular technical challenges when a VLAN change is operated by the NAS. The present technology resolves these challenges and is transparent to even "supplicant" clients.

As is known to the person skilled in the art, the information fields in each Link Layer Discovery Protocol (LLDP) frame are contained in a Link Layer Discovery Protocol Data Unit (LLDPDU) as a sequence of variable length information elements, that each include type, length, and value fields (known as TLVs). A new specific LLDP TLV has been devised to indicate "Client Disconnect" message for a given client MAC, exchanged between the NAS and the intermediate L2 bridges/switches. This new LLDP TLV mainly carries two categories of information:

1) Cmd-Type, with supported values:

Request(0): this is originated from the NAS 1 towards the intermediate L2 bridges/switches 5, 9 connecting clients 12, 13, to request port bounce on any interface that is directly connected with the client; this is also originated from NAS 1 towards the intermediate L2 Bridge/Switch 5 and AP 8, to request client disassociation at the AP;

ACK(1): this is a response from a leaf L2 switch/bridge or AP, towards uplink (where Request(0) was received from) which ultimately finds the client directly connected to one of its ports and bounces it (for example $2^{nd}$ L2 bridge/switch 9 for $2^{nd}$ client 13, or AP 8 for First client 12). Each uplink intermediate L2 switch/bridge receiving this ACK(1) in turn sends it uplink until the NAS 1 receives it;

NAK(2): this is a response from a leaf intermediate L2 switch/bridge or AP towards uplink intermediate L2 switch/bridge (for example from $2^{nd}$ L2 bridge/switch 9 to First L2 bridge/switch 5) if the client MAC address isn't found on any of their interfaces.

2) MAC-Address: this is the client MAC address whose Network Interface Controller (NIC) needs to be toggled upon the client's VLAN being changed at NAS 1.

The LLDP TLV is exchanged between the NAS 1 and intermediate L2 bridges/switches 5, 9 hop-by-hop, until it reaches the final L2 switch/bridge or the AP to which the client is directly connected, and where port bounce is triggered on the interface directly connecting the client.

According to IEEE Standard 802.1AB-2016, each LLDPDU contains, as shown in Table 1, three mandatory TLVs, and a number of optional TLVs:

TABLE 1

| TLV type | TLV name | Usage in LLDPDU |
|---|---|---|
| 0 | End of LLDPDU | Optional |
| 1 | Chassis ID | Mandatory |
| 2 | Port ID | Mandatory |
| 3 | Time To Live | Mandatory |
| 4 | Port Description | Optional |
| 5 | System Name | Optional |
| 6 | System Description | Optional |
| 7 | System Capabilities | Optional |
| 8 | Management Address | Optional |
| 9-126 | Reserved for future standardization | — |

TABLE 1-continued

| TLV type | TLV name | Usage in LLDPDU |
|---|---|---|
| 127 | Organizationally Specific TLVs | Optional |

The TLV used according to the present technology may be the one with the type=127. Other types may be used such as types 9-126 in Table 1. The new LLDP TLV may be defined as per Table 2:

TABLE 2

| TLV Type 127 | TLV Len 11 | OUI | OUI Sub-type | Cmd Type | MAC-address |
|---|---|---|---|---|---|
| 7 bits 0 | 9 bits | 3 bytes 2 | 1 byte 5 | 1 byte 6 | 6 bytes 7 |
| TLV Header | | | TLV Information String | | |

The name of the TLV may for example be: "Client Disconnect".

As regard the TLV Information String:

the organizationally unique identifier (OUI) may for example be: "0080C2";

a OUI Sub-type may for example be: "G";

the Cmd-Type may be as defined above, over the next one byte in the frame; and the MAC Address may be as defined above, over the next six bytes in the frame.

It will be available to the person skilled in the art to know how to build a specific control plane implemented at the NAS 1 and the intermediate L2 bridges/switches 5, 9 in order to handshake Client Disconnect requests and ACK/NAK messages between them. The following constraints for that control plane apply:

each of the intermediate L2 bridges/switches 5, 9 needs to maintain the following information for purposes of responding back with ACK back towards an uplink bridge/switch:

the interface on which the LLDP TLV for Client Disconnect request was received; and the client MAC address.

each of the NAS 1 and the intermediate L2 bridges/switches 5, 9 needs to determine whether the client with the client MAC address is directly or indirectly connected to any of its interfaces. For example if a bridge/switch has received a LLDP Media Endpoint Devices (MED) frame from a client with a MAC address, it can determine that such client, with the MAC address, is directly connected to it.

Figure 2:
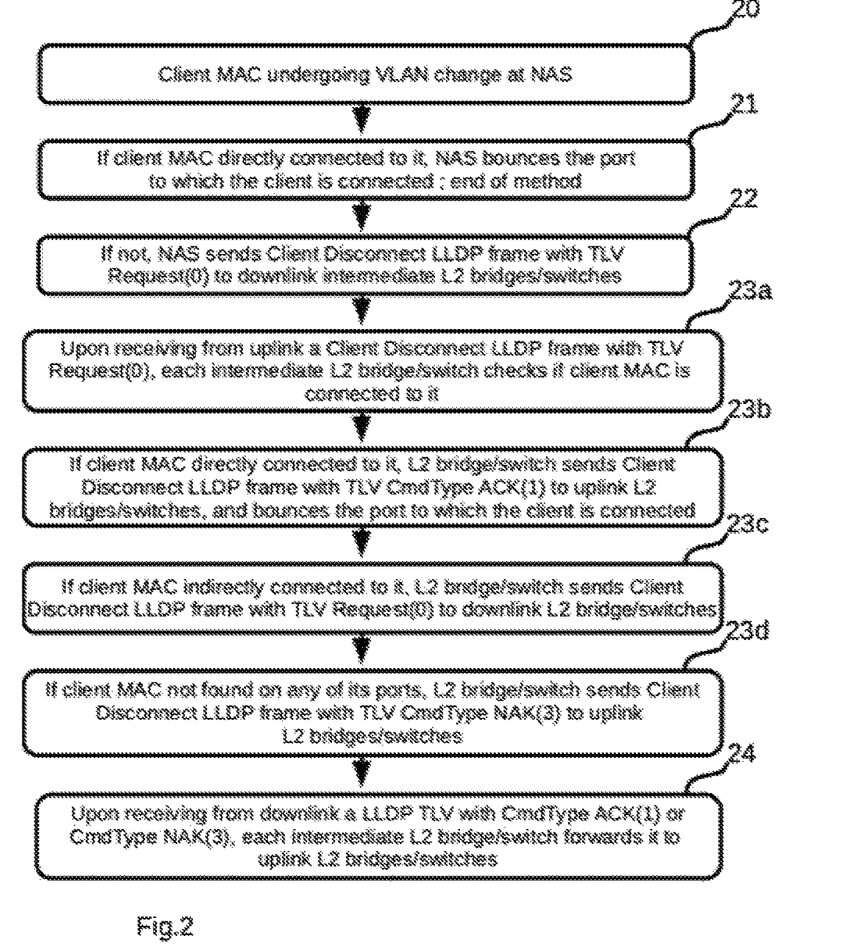
FIG. 2 illustrates a sequence of steps upon a client MAC undergoing VLAN change at the NAS.

FIG. 2 illustrates a sequence of steps upon a client MAC undergoing VLAN change at the NAS. At step 20, the client MAC undergoes a VLAN change at the NAS, for example NAS 1 of FIG. 1. A check is made at the NAS:

at step 21, if the client MAC is directly connected to the NAS, the NAS simply bounces the port connecting client MAC; this is for example the case on FIG. 1 with 3rd L2 bridge/switch 14 being directly connected to NAS 1. The process may stop;

at step 22, if not, the NAS may send Client Disconnect LLDP frames with TLV Request(0) to downlink L2 bridges/switches, for example to First L2 bridge/switch 5 on FIG. 1. This is done on NAS interface where the client MAC was assigned (for example based on LLDP MED frame reception from the client MAC).

At First L2 bridge/switch 5, and generally at each intermediate L2 bridge/switch, a check is made, at step 23a, upon receiving from uplink a Client Disconnect LLDP frame with TLV Request(0), whether the client MAC is directly connected to the intermediate L2 bridge/switch:

at step 23b, if the client MAC is directly connected to the intermediate L2 bridge/switch, the intermediate L2 bridge/switch simply bounces the port connecting client MAC, sends Client Disconnect LLDP frames with TLV CmdType ACK(1) to uplink intermediate L2 bridges/switches: this is for example the case on FIG. 1 with $2^{nd}$ L2 bridge/switch 9 to which $2^{nd}$ Client 13 is directly connected. The step is repeated until the NAS gets the same frame, at which point the process may stop;

at step 23c, if the client MAC is found as assigned on one of the interfaces of the intermediate L2 bridge/switch (ie: indirectly connected), it sends Client Disconnect LLDP frames with TLV Request(0) to downlink intermediate L2 bridges/switches: this is for example the case on FIG. 1, with First L2 bridge/switch 5 as regard $2^{nd}$ Client 13;

at step 23d, if the client MAC is not found assigned on any of the interfaces of the intermediate L2 bridge/switch (ie: not connected, either directly or indirectly), it sends Client Disconnect LLDP frames with TLV CmdType NAK(2) to uplink intermediate L2 bridges/switches: this is for example the case on FIG. 1, with First L2 bridge/switch 5 as regard 3rd Client 14. Steps 23a-d are repeated at each of the downlink intermediate L2 bridges/switches until the last/leaf L2 bridge/switch directly connecting the client MAC bounces the port connecting that client.

At each intermediate L2 bridge/switch, at step 24, any Client Disconnect LLDP frame with TLV CmdType ACK(1) or NAK(2) received from downlink, is forwarded uplink. This is for example the case on FIG. 1, with First L2 bridge/switch 5 as regard $2^{nd}$ Client 13 (ACK(1)) or $3^{rd}$ Client 14 (NAK(2)).

If the NAS doesn't receive any Client Disconnect LLDP frame with TLV CmdType ACK(1) or NAK(2) within a predetermined timeout value, it may resend Client Disconnect LLDP frames with TLV Request(0) to downlink L2 bridges/switches. The number of retries may also be a predetermined number.

The predetermination of either or both of these values may be in relation to the latency as it relates to a characteristic of the network and its topology.

Similarly, it will be available to the person skilled in the art to know how to build a specific control plane implemented at the NAS 1, the intermediate L2 bridges/switches 5, 9 and the AP 8, in order to handshake Client Disconnect requests and ACK/NAK messages between it and the NAS 1 and/or the intermediate L2 bridges/switches 5, 9.

The following constraints for that control plane apply:

each of the intermediate L2 bridges/switches 5, 9 and AP 8 needs to maintain the following information for purposes of responding back with ACK back towards an uplink bridge/switch:

the interface on which the LLDP TLV for Client Disconnect request was received; and the client MAC address.

each of the NAS 1, the intermediate L2 bridges/switches 5, 9 and the AP 8 needs to determine whether the client with the client MAC address is directly or indirectly connected to any of its interfaces.

The AP may then handle Client Disconnect LLDP frames as described above, as if an intermediate L2 bridge/switch, which may be leveraged equally for wireless clients where the clients are associated to a SSID.

The DHCP lease request for the client MAC (wired/wireless) ultimately gets requested in the new VLAN to which the client MAC gets assigned after VLAN change, on the NAS port after port-bounce/client-disassociation at any intermediate L2 bridge/switch or AP to which the client is directly connected.

Figure 3:
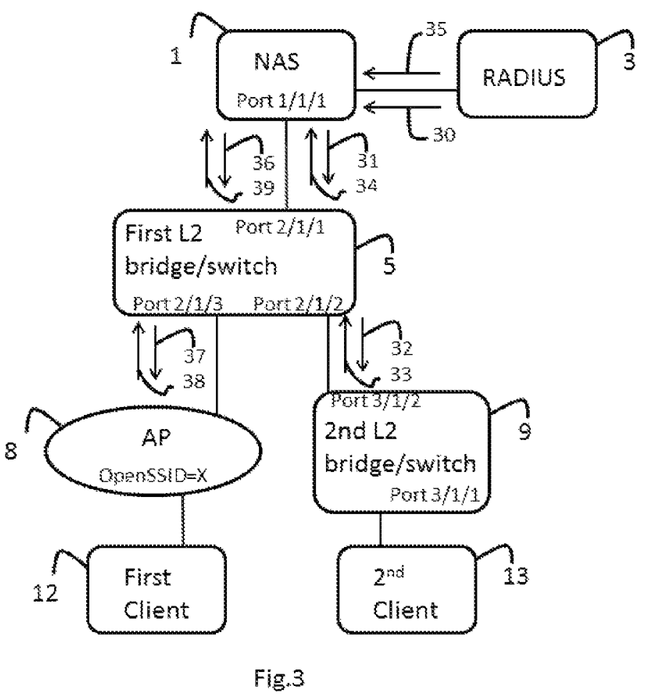
FIG. 3 illustrates the process of non-supplicant clients undergoing VLAN change at the NAS and the network topology of FIG. 1.

FIG. 3 illustrates the process of non-supplicant or wireless clients undergoing VLAN change at the NAS and the network topology of FIG. 1. The following assumptions apply:

on NAS 1: (i) all the client MACs ultimately get authenticated and assigned in a particular VLAN for network access, and (ii) client MACs get DHCP IP address leased in the assigned VLAN on NAS port 1/1/1;

on 2nd L2 bridge/switch 9 a wired non-supplicant 2nd Client 13 is directly connected on port 3/1/1, whose MAC address: 00:00:00:00:00:01 gets assigned on NAS 1 in VLAN:10 on NAS port 1/1/1 initially;

on AP 8 a wireless First Client 12 is associated to Open SSID=X, whose MAC address: 00:00:00:00:00:02 gets assigned on NAS 1 in VLAN:10 on NAS port 1/1/1 initially;

traffic from both wired client MAC: 00:00:00:00:00:01 and wireless client MAC: 00:00:00:00:00:02 reaches NAS 1, where it initially gets assigned into a temporary guest VLAN:10 on port 1/1/1, and the client MAC initiates DHCP, and gets DHCP IP address leased in VLAN:10 subnet.

As regard wired non-supplicant 2nd Client 13, the process involves the following steps, going downlink:

at reference 30 on FIG. 3, the MAC 00:00:00:00:00:01 is challenged to undergo Captive-Portal authentication, resulting in $2^{nd}$ Client 13 getting successfully authenticated and assigned VLAN: 20 on NAS 1 port 1/1/1;

at reference 31, NAS 1 sends LLDP TLV "Client Disconnect" with (MAC=00:00:00:00:00:01, CmdType=Request(0)) out on Port 1/1/1;

the First L2 bridge/switch 5 receives this LLDP TLV "Client Disconnect" message, and searches its L2 table for the MAC, where it finds the MAC assigned in VLAN: 1 on its port 2/1/2. Since First L2 bridge/switch 5 determines this MAC as being not directly connected to it (no LLDP MED received from the MAC), it sends out LLDP TLV (CmdType=Request(0), MAC=00:00:00:00:00:01) out on its port 2/1/2 at reference 32; and the 2nd L2 bridge/switch receives this LLDP TLV CmdType=Request(0) message, and searches its L2 table for the MAC, where it finds the MAC assigned in VLAN: 1 on its port 3/1/1. Since 2nd L2 bridge/switch determines this MAC as being directly connected (as it had received LLDP MED frame from the client MAC) to it, it bounces its port 3/1/1, thereby facilitating the client NIC to be toggled. This results in the client MAC getting re-assigned in the new VLAN: 20 on NAS 1, and the $2^{nd}$ Client 13 initiating fresh DHCP IP address request in the new VLAN: 20.

The process further involves the following steps, going uplink:

at reference 33, 2nd L2 bridge/switch generates LLDP TLV (CmdType=ACK(1), MAC: 00:00:00:00:00:01) out of its port 3/1/2;

First L2 bridge/switch 5 receives the LLDP TLV CmdType=ACK(1) message on its port 2/1/2, and generates LLDP TLV (CmdType=ACK(1), MAC: 00:00:00:00:00:01) out of its port 2/1/1 at reference 34;

NAS 1 receives the LLDP TLV CmdType=ACK(1) message, and determines port bounce for the client MAC:00: 00:00:00:00:01 was successful. It no longer retries sending LLDP TLV "Client Disconnect".

As regard wireless First Client 12, the process involves the following steps, going downlink:

at reference 35 on FIG. 3, NAS 1 receives a CoA message for the MAC 00:00:00:00:00:02 resulting in the First Client 12 getting successfully authenticated and assigned VLAN: 20 on NAS 1 port 1/1/1;

at reference 36, NAS 1 sends LLDP TLV "Client Disconnect" with (MAC=00:00:00:00:00:02, CmdType=Request(0)) out on Port 1/1/1;

the First L2 bridge/switch 5 receives this LLDP TLV "Client Disconnect" message, and searches its L2 table for the MAC, where it finds the MAC assigned in VLAN: 1 on its port 2/1/3. Since First L2 bridge/switch 5 determines this MAC as being not directly connected to it (no LLDP MED received from the MAC), it sends out LLDP TLV (CmdType=Request(0), MAC=00:00:00:00:00:02) out on its port 2/1/3 at reference 37; and AP 8 receives this LLDP TLV CmdType=Request(0) message, and searches its L2 table for the MAC, where it finds the MAC assigned in SSID=X. AP 8 determines this MAC as being directly connected (ie: associated in an SSID) to it. AP 8 disassociates the client MAC: 00:00:00:00:00:02. This lets the client NIC to be toggled, and results in the client MAC again attempting to associate to AP 8. Upon re-association at AP 8, the client MAC: 00:00:00:00:00:02 gets re-assigned in the new VLAN: 20 on NAS 1, and the First Client 12 initiates fresh DHCP IP address in the new VLAN:20.

The process further involves the following steps, going uplink:

at reference 38, AP 8 generates LLDP TLV (CmdType=ACK(1), MAC: 00:00:00:00:00:02) out of its port connecting to the First L2 bridge/switch 5;

First L2 bridge/switch 5 receives the LLDP TLV CmdType=ACK(1) message on its port 2/1/3, and generates LLDP TLV (CmdType=ACK(1), MAC: 00:00:00:00:00:02) out of its port 2/1/1 at reference 39;

NAS 1 receives the LLDP TLV CmdType=ACK(1) message, and determines port bounce for the client MAC:00: 00:00:00:00:02 was successful. It no longer retries sending LLDP TLV "Client Disconnect".

Figure 4:
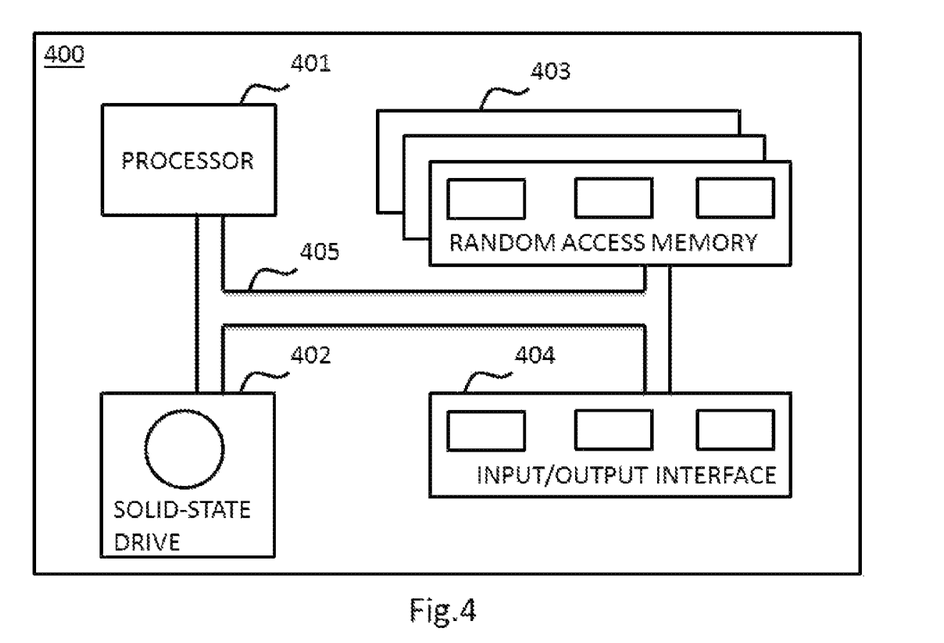
FIG. 4 illustrates an example of a computing device that may be used to implement the methods and processes described herein.

FIG. 4 illustrates an example of a computing device that may be used to implement any of the methods and processes described herein. 400 represents a computing environment in accordance with an embodiment of the present technology, as may be implemented in a NAS (1), an intermediate L2 bridge/switch (5, 9) or an AP (8). In some embodiments, the computing environment 400 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 400 comprises various hardware components including one or more single or multi-core processors collectively represented by a processor 401, a solid-state drive 402, a random-access memory 403 and an input/output interface 404.

In some embodiments, the computing environment 400 may also be a sub-system of one of the above-listed systems. In some other embodiments, the computing environment 400 may be an "off the shelf" generic computer system. In some embodiments, the computing environment 400 may also be distributed amongst multiple systems. The computing environment 400 may also be specifically dedicated to the implementation of the present technology. As a person in the art of the present technology may appreciate, multiple variations as to how the computing environment 400 is implemented may be envisioned without departing from the scope of the present technology.

Communication between the various components of the computing environment 400 may be enabled by one or more internal and/or external buses 705 (e.g. a PCI bus, universal serial bus, IEEE 1394 "Firewire" bus, SCSI bus, Serial-ATA bus, ARINC bus, etc.), to which the various hardware components are electronically coupled.

The input/output interface 404 may allow enabling networking capabilities such as wire or wireless access. As an example, the input/output interface 404 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP). According to implementations of the present technology, the solid-state drive 402 stores program instructions suitable for being loaded into the random-access memory 403 and executed by the processor 401 for executing operating data centers based on a generated machine learning pipeline. For example, the program instructions may be part of a library or an application.

The invention claimed is:

1. A method of moving, by a server, a client with a MAC address, from a first virtual local area network (VLAN) to a second VLAN, wherein a leaf comprised of a plurality of layer 2 (L2) bridges or switches is connected to the server, the method comprising the steps of:
    sending, by the server, a first message downlink to at least one L2 bridge or switch of the plurality of L2 bridges or switches;
    at each L2 bridge or switch in the plurality of L2 bridges or switches, after receiving the first message from the server or from another L2 bridge or switch of the plurality of L2 bridges or switches:
        determining whether the client is directly or indirectly connected to a port of the respective L2 bridge or switch, and
            if the client is directly connected, bouncing the port to which the client is connected, and sending a second message uplink to the server or to another L2 bridge or switch of the plurality of L2 bridges or switches,
            if the client is indirectly connected, sending the first message downlink, via the port to which the client is indirectly connected, to another L2 bridge or switch of the plurality of L2 bridges or switches, or
            if the client is not connected directly or indirectly to a port of the respective at least one intermediate L2 bridge or switch, sending a third message uplink to the server or another L2 bridge or switch of the plurality of L2 bridges or switches; and
    after receiving the second or third message from downlink, forwarding the second or third message uplink to the server or to another L2 bridge or switch in the leaf; and
    initiating, by the client, a dynamic host configuration protocol (DHCP) request in the second VLAN.

2. The method of claim 1, wherein the leaf is further comprised of at least one access point (AP) and the client is connected to one of the at least one AP, the method further comprising:
    at each AP of the at least one AP and after receiving the first message from uplink from the server or an L2 bridge or switch of the plurality of L2 bridges or switches:
        determining whether the client is directly connected to a port of the respective AP, and:
            if it is directly connected, disassociating then reassociating the MAC address of the client, and sending a second message uplink to the server or an L2 bridge or switch of the plurality of L2 bridges or switches; and
            if it is not directly connected, sending a third message uplink to the server or an L2 bridge or switch of the plurality of L2 bridges or switches.

3. The method of claim 1, wherein the first message comprises a link layer discovery protocol data unit (LLDPDU) with a Cmd-Type Request(0) and the MAC address.

4. The method of claim 1, wherein the second message comprises a LLDPDU with a Cmd-Type ACK(1) and the MAC address.

5. The method of claim 1, wherein the third message comprises a LLDPDU with a Cmd-Type NAK(2) and the MAC address.

6. The method of claim 1, in which the first message comprises a LLDPDU with a Cmd-Type Request(0) and the MAC address, the second message comprises a LLDPDU with a Cmd-Type ACK(1) and the MAC address, and the third message comprises a LLDPDU with a Cmd-Type NAK(2) and the MAC address, and wherein the Cmd-Type and the MAC address of the client are included in one of the TLV types 9-127 in a 802.1AB IEEE Standard LLDPDU.

7. The method of claim 1 in which the client is a non-supplicant client.

8. The method of claim 2, wherein the first message comprises a link layer discovery protocol data unit (LLDPDU) with a Cmd-Type Request(0) and the MAC address.

9. The method of claim 2, wherein the second message comprises a LLDPDU with a Cmd-Type ACK(1) and the MAC address.

10. The method of claim 2, wherein the third message comprises a LLDPDU with a Cmd-Type NAK(2) and the MAC address.

11. The method of claim 2 in which the client is a non-supplicant client.

12. A layer 2 (L2) bridge or switch in a leaf, the L2 bridge or switch comprising:
    at least one processor;
    a plurality of ports; and
    memory comprising executable instructions which, when executed by the at least one processor, cause the L2 bridge or switch to:
        after receiving a first message from uplink from a server connected to the leaf or from an intermediate uplink L2 bridge or switch in the leaf, determine whether a client corresponding to the first message is directly or indirectly connected to a port of the plurality of ports, and if the client is directly connected, bounce the port to which the client is connected, and send a second message uplink to the server or the intermediate uplink L2 bridge or switch in the leaf, if the client is indirectly connected, send the first message downlink on the port to which the client is indirectly connected, to a downlink intermediate L2 bridge or switch in the leaf, or if the client is not connected, send a third message uplink to the server or to the uplink intermediate L2 bridge or switch in the leaf; and after receiving the second or third message from the downlink intermediate L2 bridge or switch in the leaf, forwarding the second or third message uplink to the server or to the uplink intermediate L2 bridge or switch in the leaf.

13. The layer 2 (L2) bridge or switch of claim 12, wherein the first message comprises a link layer discovery protocol data unit (LLDPDU) with a Cmd-Type Request(0) and the MAC address.

14. The layer 2 (L2) bridge or switch of claim 12, wherein the second message comprises a LLDPDU with a Cmd-Type ACK(1) and the MAC address.

15. The layer 2 (L2) bridge or switch of claim 12, wherein the third message comprises a LLDPDU with a Cmd-Type NAK(2) and the MAC address.

16. The layer 2 (L2) bridge or switch of claim 12, in which the first message comprises a link layer discovery protocol data unit (LLDPDU) with a Cmd-Type Request(0) and the MAC address, the second message comprises a LLDPDU with a Cmd-Type ACK(1) and the MAC address, and the third message comprises a LLDPDU with a Cmd-Type NAK(2) and the MAC address, and wherein the Cmd-Type and the MAC address of the client are included in one of the TLV types 9-127 in a 802.1AB IEEE Standard LLDPDU.

17. A server comprising:
at least one processor; and
a memory comprising executable instructions which, when executed by the at least one processor, cause the server to:
receive a request to move a client from a first virtual local area network (VLAN) to a second VLAN, wherein the client is associated with a media access control (MAC) address and wherein the request comprises the MAC address;
after receiving the request to move the client, send a first message downlink to at least one of intermediate layer 2 (L2) bridges, switches, and access points (APs) in a leaf directly connected to the server; and
receive, from downlink from any intermediate L2 bridge, switch, or AP in the leaf, a second message indicating that a port to which the client is connected was bounced, or that the MAC address was disassociated and re-associated
after receiving, allowing the client to initiate a dynamic host configuration protocol (DHCP) request in the second VLAN.

18. The server of claim 17, wherein the first message comprises a link layer discovery protocol data unit (LLDPDU) with a Cmd-Type Request(0) and the MAC address.

19. The server of claim 17, wherein the second message comprises a LLDPDU with a Cmd-Type ACK(1) and the MAC address.

20. The server of claim 17, in which the first message comprises a link layer discovery protocol data unit (LLDPDU) with a Cmd-Type Request(0) and the MAC address, and the second message comprises a LLDPDU with a Cmd-Type ACK(1) and the MAC address, and wherein the Cmd-Type and the MAC address of the client are included in one of the TLV types 9-127 in a 802.1AB IEEE Standard LLDPDU.

* * * * *